United States Patent [19]

McBride et al.

[11] Patent Number: 5,768,740
[45] Date of Patent: Jun. 23, 1998

[54] DEBRIS EXHAUST SYSTEM

[75] Inventors: Donald D. McBride, Albuquerque, N. Mex.; Dominic Bua, Lynnfield, Mass.; Yacov Domankevitz, Brookline, Mass.; Norman Nishioka, Wayland, Mass.

[73] Assignee: Sandia Corporation, Albuquerque, N. Mex.

[21] Appl. No.: 442,537

[22] Filed: May 16, 1995

[51] Int. Cl.$^6$ ..................................................... A47L 5/36
[52] U.S. Cl. ............................ 15/301; 15/415.1; 604/313
[58] Field of Search ......................... 15/301, 310; 4/313

[56] References Cited

U.S. PATENT DOCUMENTS

| | | | |
|---|---|---|---|
| 2,437,340 | 3/1948 | Zugehoer | 15/310 |
| 2,519,254 | 8/1950 | Kersky | 15/310 |
| 4,594,747 | 6/1986 | Dempsey | 15/301 |
| 4,947,510 | 8/1990 | English | 15/310 |
| 5,192,276 | 3/1993 | Gatti | 604/313 |
| 5,211,639 | 5/1993 | Wilk | 604/313 X |
| 5,215,539 | 6/1993 | Schoolman | 604/313 X |

FOREIGN PATENT DOCUMENTS 1900890  8/1970  Germany .................. 15/310

*Primary Examiner*—Chris K. Moore
*Attorney, Agent, or Firm*—V. Gerald Grafe

[57] ABSTRACT

A debris removal system removes debris from a work site by flowing fluid away from the work site toward the periphery of a structure. The fluid flow can be kept constant around the periphery so that debris is removed evenly. The structure can have a reduced cross section between the fluid inlet and the work site so that the resulting increased fluid velocity works to prevent debris from escaping.

9 Claims, 6 Drawing Sheets

DEBRIS EXHAUST SYSTEM

This invention was made with Government support under Contract DE-AC04-94AL85000 awarded by the U.S. Department of Energy. The Government has certain rights in the invention.

BACKGROUND OF THE INVENTION

This invention uses a moving fluid, preferably a gas, to remove debris from a work site. It is especially well suited for the removal of hazardous debris, or debris that must not remain near the work site. Examples of such applications include the removal of smoke and tissue debris during laser surgery and surgical electrocautery, and the removal of material debris during industrial welding and drilling.

Some medical and industrial operations generate debris that will interfere with the operation if allowed to remain near the work site. The efficient removal of that debris is crucial to the efficiency and safety of the operation. The removal means is even more important when the debris is hazardous. Material processing by laser is one operation where the work site must be kept free from debris, since debris could interfere with the laser's path to the surface. Operations requiring visual observation also need to have debris removed efficiently, since clouds of debris could obscure the work site from observation. The debris removal system must not allow debris to escape when the operation generates hazardous debris.

One approach uses a vacuum source connected to one end of a hollow wand. The other end is held near the work site, drawing in debris-laden ambient air. The vacuum wand removes debris directly from the work site, but the wand itself can interfere with the operation. The wand also can allow debris to escape.

Another approach uses a flexible enclosure placed over and around the work site and instrument. The flexible enclosure can prevent debris escape. A vacuum source attached to the flexible enclosure can remove some debris. The debris and air flow patterns are irregular, leaving debris in the enclosure until it finds its way to the vacuum connection.

There is a need for a debris removal system that does not allow debris to escape and that has flow patterns that remove debris quickly from a work site.

SUMMARY OF THE INVENTION

An object of the present invention is to provide a debris removal system that removes debris from a work site without allowing debris to escape.

Another object of the present invention is to provide a debris removal system that removes debris uniformly from the work site so that debris does not interfere with the work.

A further object of the present invention is to provide a debris removal system that keeps the volume near the work site free from debris so that optical or surgical work can be performed and so that the work site can be visually observed.

A further object of the present invention is to provide a debris removal system that allows the injection of specialized fluids over the work site.

Additional objects, advantages, and novel features will become apparent to those skilled in the art upon examination of the following description or may be learned by practice of the invention. The objects and advantages of the invention may be realized and attained by means of the instrumentalities and combinations particularly pointed out in the appended claims.

In this invention, a structure contains a volume adjacent to the work site. The structure allows fluid, typically a gas, into the volume. The designed fluid flow carries smoke and debris from the work site. An external vacuum system removes the debris-laden fluid.

The structure can have a plurality of openings near the work site. A plenum can bring the fluid from the openings to a vacuum connection. The fluid flow carries the debris from the work site, through the openings and into the plenum. The debris thereby exits around the periphery of the work site, reducing the time the debris spends in the work volume.

In one embodiment of the invention, the plenum allows fluid to flow in only one direction. The vacuum connects to one end of the unidirectional plenum. The openings vary in area; the opening area increases as the length of the path from the opening to the vacuum connection increases. The total area of the openings is substantially the same as the vacuum connection area. The openings thus do not restrict the fluid flow. The graduated opening size causes the fluid flow velocity to be roughly the same through all the openings. The debris exits from the work volume evenly around the periphery of the structure, keeping the work volume uniformly clear of debris.

In a further embodiment of the invention, the structure shape includes a nozzle feature. A portion of the structure away from the work site is open to allow gas into the volume. Another portion of the structure, between that opening and the work site, has a smaller cross sectional area than the work site or the opening. The fluid flow velocity is higher through the portion of the structure with the smaller area. The higher fluid velocity inhibits the escape of debris from the portion of the work volume between the work site and the reduced cross sectional area.

The opening can also have projections mounted on it, oriented so that fluid flowing over them spirals across the structure walls. The vortical flow thus induced promotes a high velocity near the structure walls, entraining debris near the structure walls so that the work site can be more easily observed.

Fluid can also be directly injected into the structure. The fluid can be injected with a velocity suitable to induce vortical flow. The fluid injection can be a complement to an opening to ambient air or as the sole source of fluid to a sealed enclosure. The fluid injected can be fluid essential to the work, or can be inert fluid intended to efficiently remove debris while inhibiting combustion of flammable debris.

DESCRIPTION OF THE FIGURES

The accompanying drawings, which are incorporated into and form part of the specification, illustrate an embodiment of the invention and, together with the description, serve to explain the principles of the invention.

FIG. 2a is an isometric view of another embodiment of the invention.

FIG. 2b is a sectional view of the debris removal openings and distribution plenum of the structure of FIG. 2a.

DETAILED DESCRIPTION OF THE INVENTION

Figure 1:
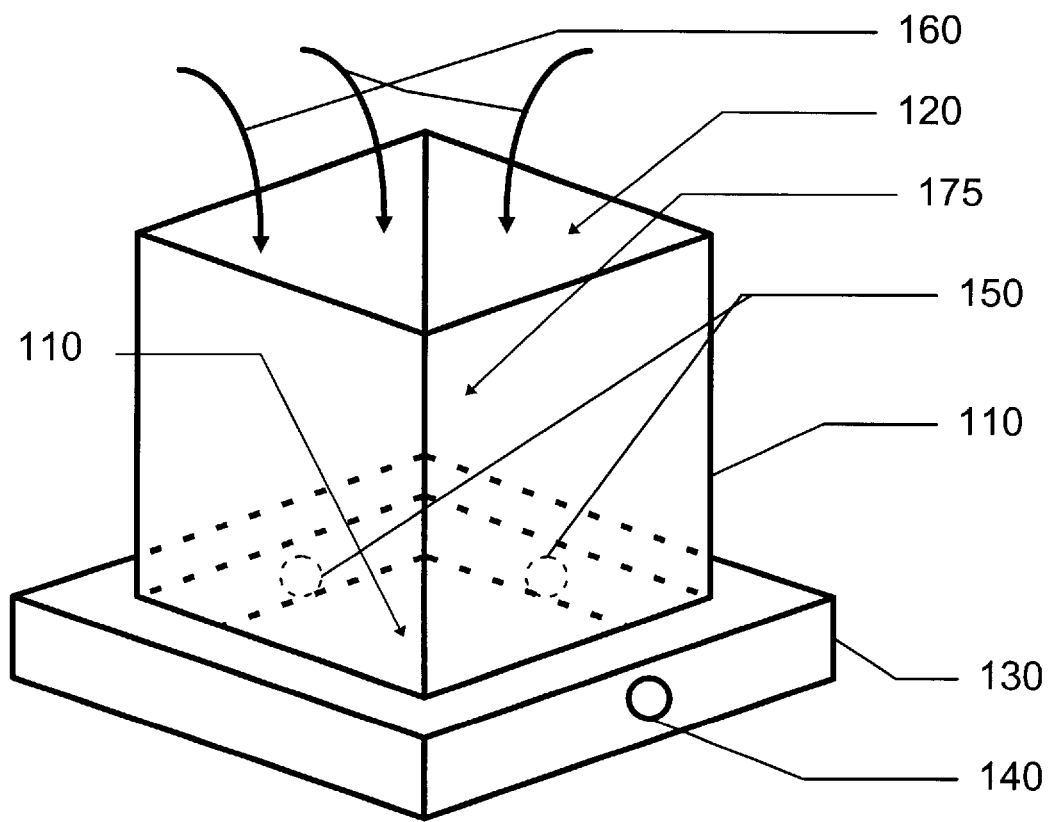
FIG. 1 is an isometric view of one embodiment of the invention.

FIG. 1 shows one embodiment of the current invention. A structure 110 partially encloses a work volume 175 over a work site 170. A plenum 130 surrounds removal openings 150 spaced around a portion of the structure 110 adjacent the work site 170. The plenum connects to an external vacuum source 140. Air (flow represented by streamlines 160) enters through an opening 120 in the structure 110, flows through the work volume 175 and exits through the removal openings 150. Debris generated at the work site 170 flows with the air into the plenum 130 and then to the external vacuum source 140. The air flow 160 can keep debris from escaping out of the opening 120. The flow 160 can also keep the work volume 175 substantially clear of debris, since the flow 160 can be maintained whenever there is debris present.

Figures 2A, 2B:
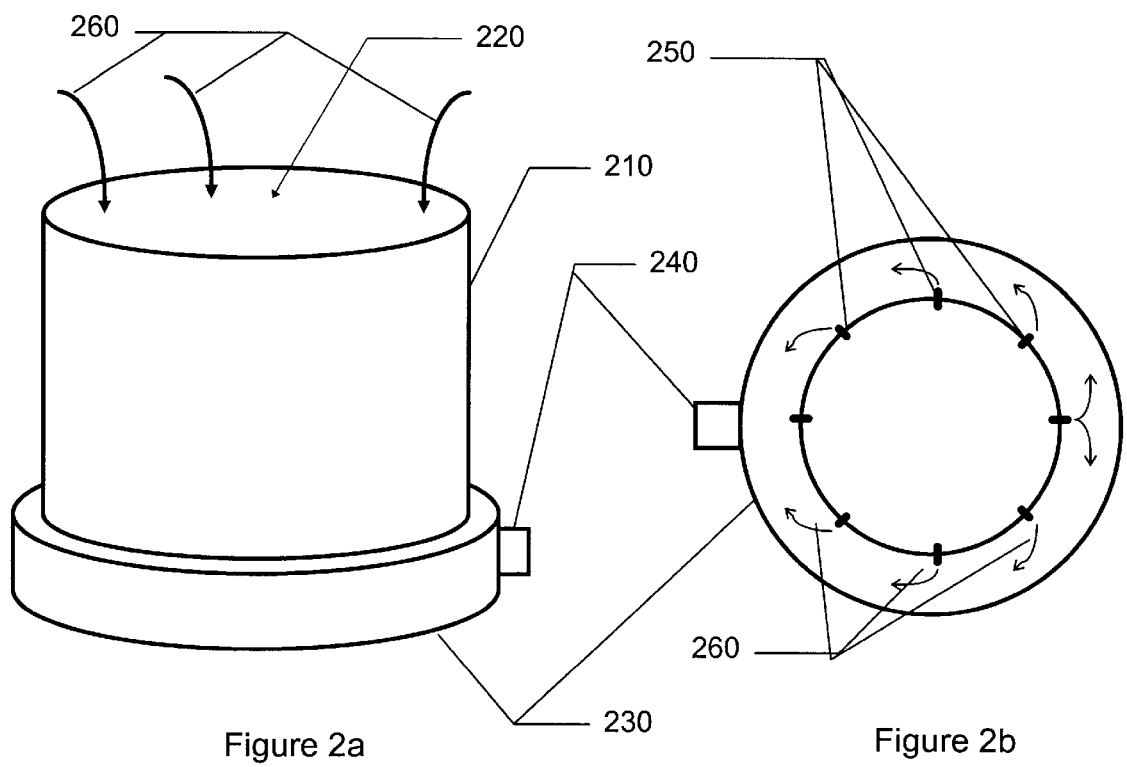

Another embodiment of the invention is shown in FIG. 2. The structure 210 is roughly cylindrical, as is the plenum 230. Removal openings 250 are spaced around the periphery of the structure 210. Debris-laden air (stream lines 260) enters the work volume through an opening 220 and leaves the work volume around the periphery of the structure 210. Debris thus exits the work volume directly through the plenum 230 to the external vacuum 240 through the closest removal opening, minimizing the time the debris could interfere with the operation.

Figure 3:
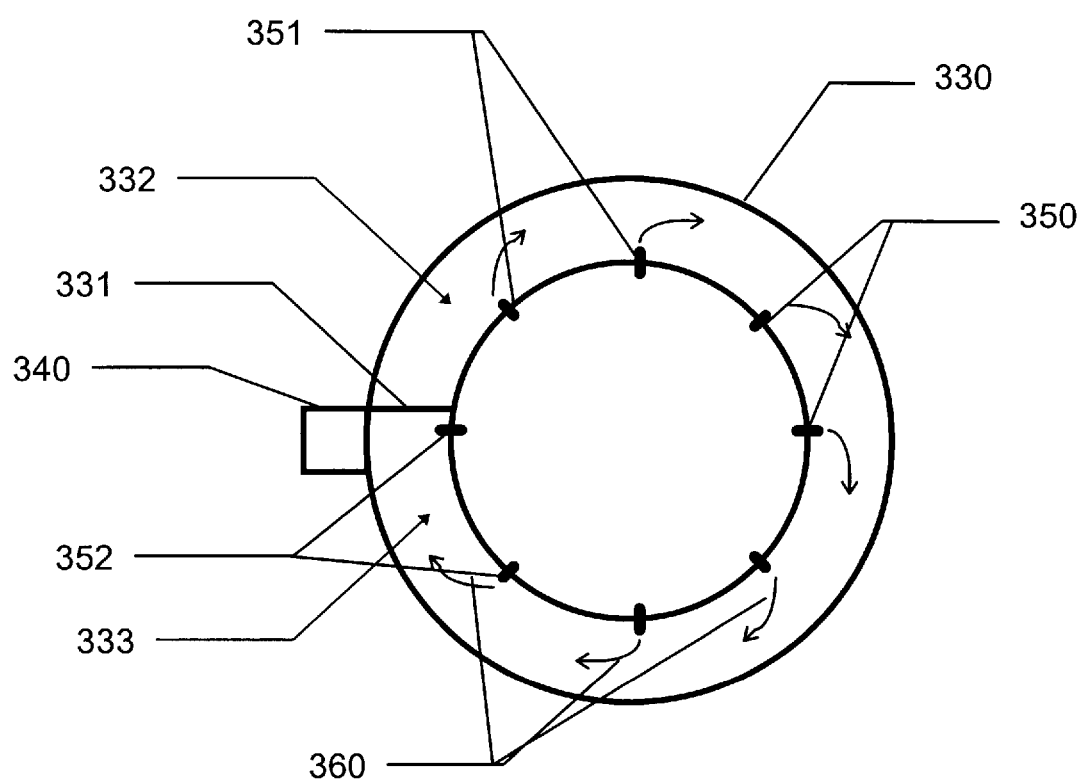
FIG. 3 is a sectional view through a plenum according to the present invention.

FIG. 3 shows an improvement to the embodiment in FIG. 2. The plenum 330 is closed by a closure 331 so air (or another debris removal fluid) flows from end 332 to end 333. The removal openings 350 are sized so that the total opening area is approximately equal to the area of the vacuum connection 340 so that the air flow is unimpeded. The openings 350 are also graduated in size, with openings 351 near end 332 larger than openings 352 near end 333. The fluid flow and velocity through the openings 350 is thus substantially the same for all the openings 350, resulting in debris removal that is even around the periphery of the structure.

Figure 4:
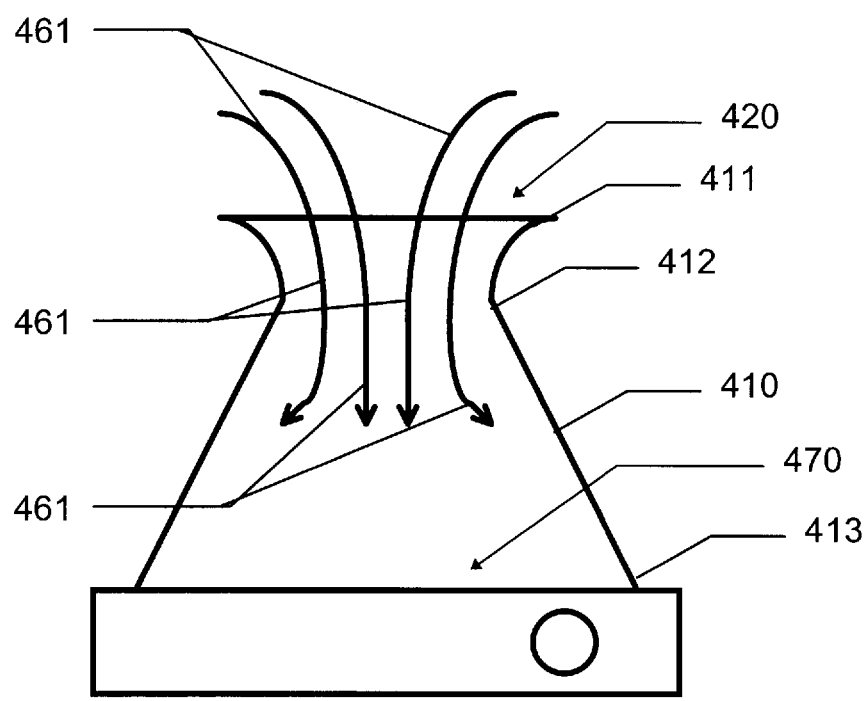
FIG. 4 is an isometric view of one embodiment of the present invention.

FIG. 4 shows another embodiment of the present invention. The structure 410 has a first cross sectional area 413 near the work site 470 and a second cross sectional area 411 near the opening 420. In between, the structure has a third cross sectional area 412. The area 412 is less than the other two areas 411, 413. The fluid velocity 462 through the third area 412 is therefore greater than the fluid velocity 461 through the first area 411 and the fluid velocity 463 through the second area 413. The increased fluid velocity acts as an additional barrier to prevent the escape of debris from the structure except through the removal openings.

Figure 5:
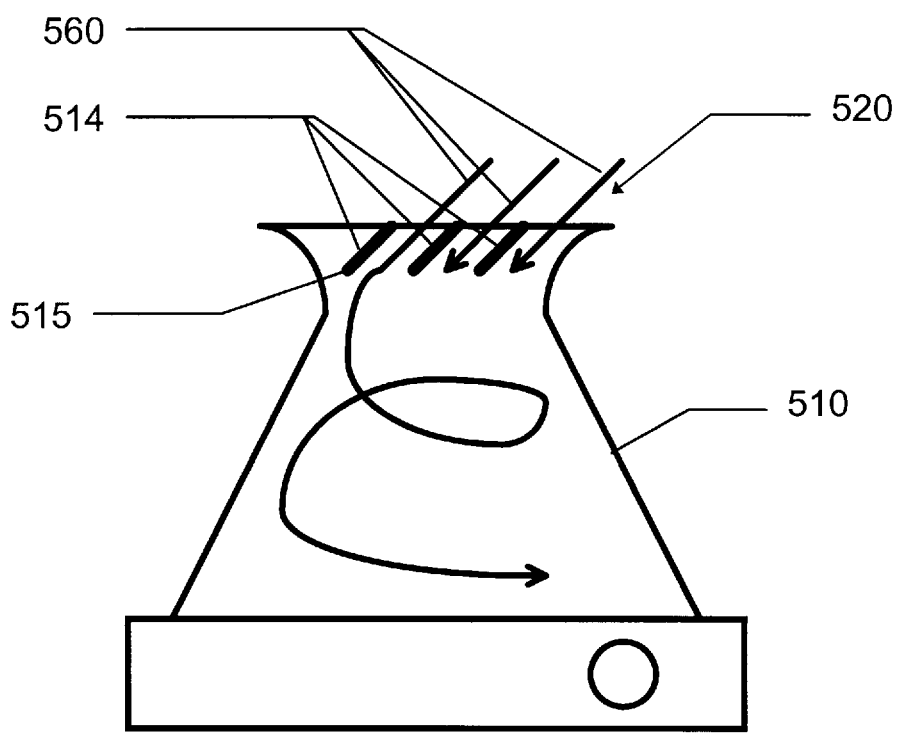
FIG. 5 is an isometric view of another embodiment of the present invention.

FIG. 5 shows an embodiment of the present invention that can maintain visibility of the work site. The structure 510 has projections 514 mounted near the opening 520. The projections are oriented so that fluid flow 560 spirals down structure The vortical flow induced can discourage the deposition of debris on the structure, maintaining visibility of the work site. Additionally, additional fluid (an inert gas, for example) can be injected into the work volume through ports 15 on the projections, strengthening the vortical flow.

Figure 6:
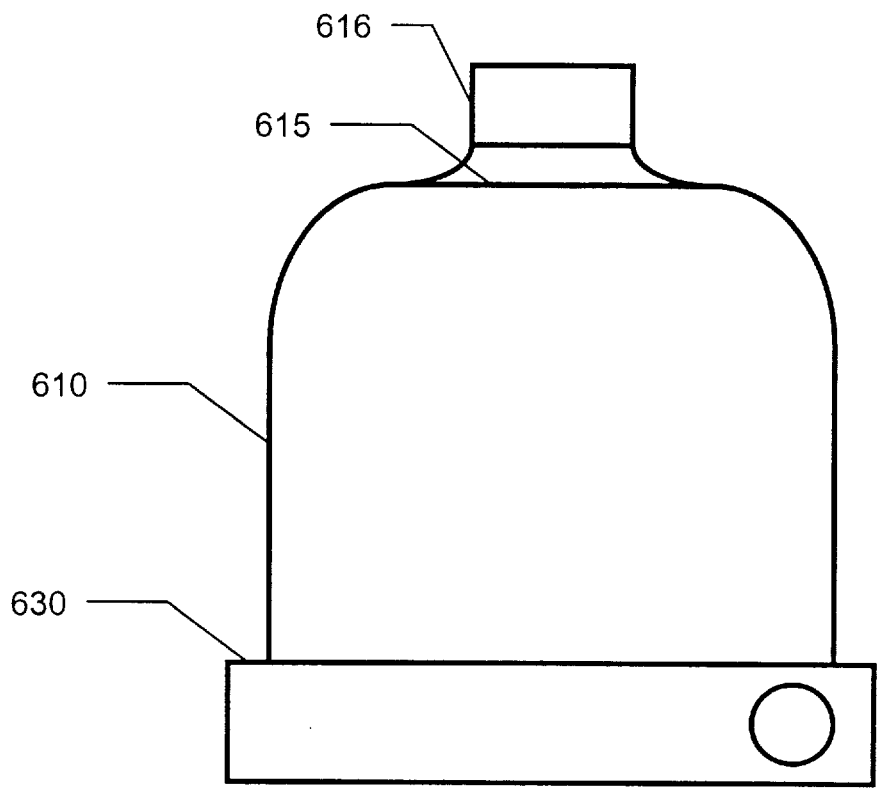
FIG. 6 is an isometric view of another embodiment of the present invention.

FIG. 6 shows an embodiment that can be sealed from the ambient air. The structure 610 is adapted at one end 616 to sealingly engage an instrument. The instrument operates on the work site. A fluid is introduced into the work volume through ports 615. The debris-laden fluid exits from the work volume via a plenum 630. Debris can thus be removed efficiently without the use of any ambient air. This would be important where especially hazardous debris was present or where ambient air could not be allowed to contact the work site or debris.

Figure 7:
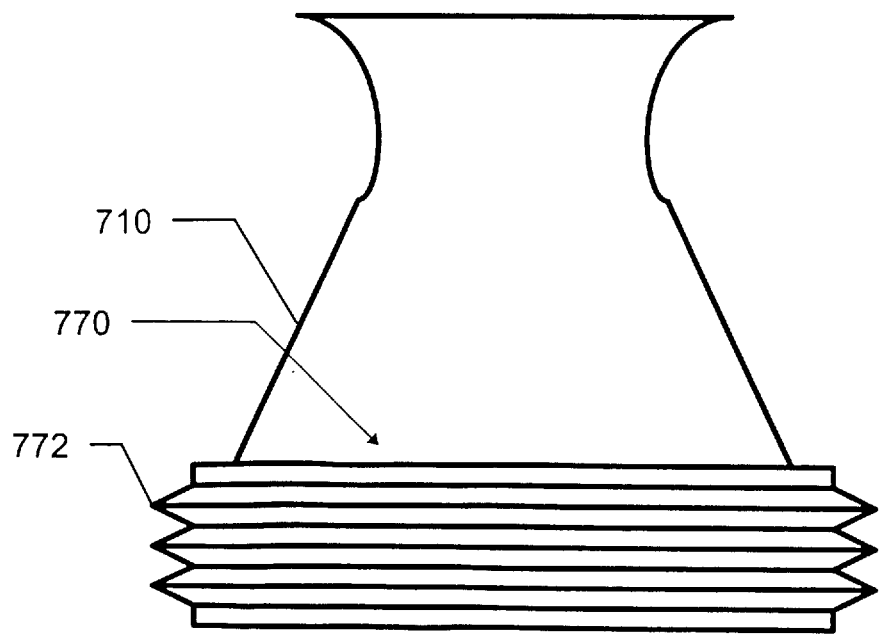
FIG. 7 is an isometric view of an embodiment having a compliant seal for further isolating the work site from the surroundings.

FIG. 7 shows the present invention adapted to closely fit a work site. A flexible member 772 is mounted to the portion of the structure 710 adjacent the work site 770. The flexible member minimizes the influx of air through the bottom of the work site, and minimizes the chances for debris to escape between the work site 770 and the structure 710.

Figure 8:
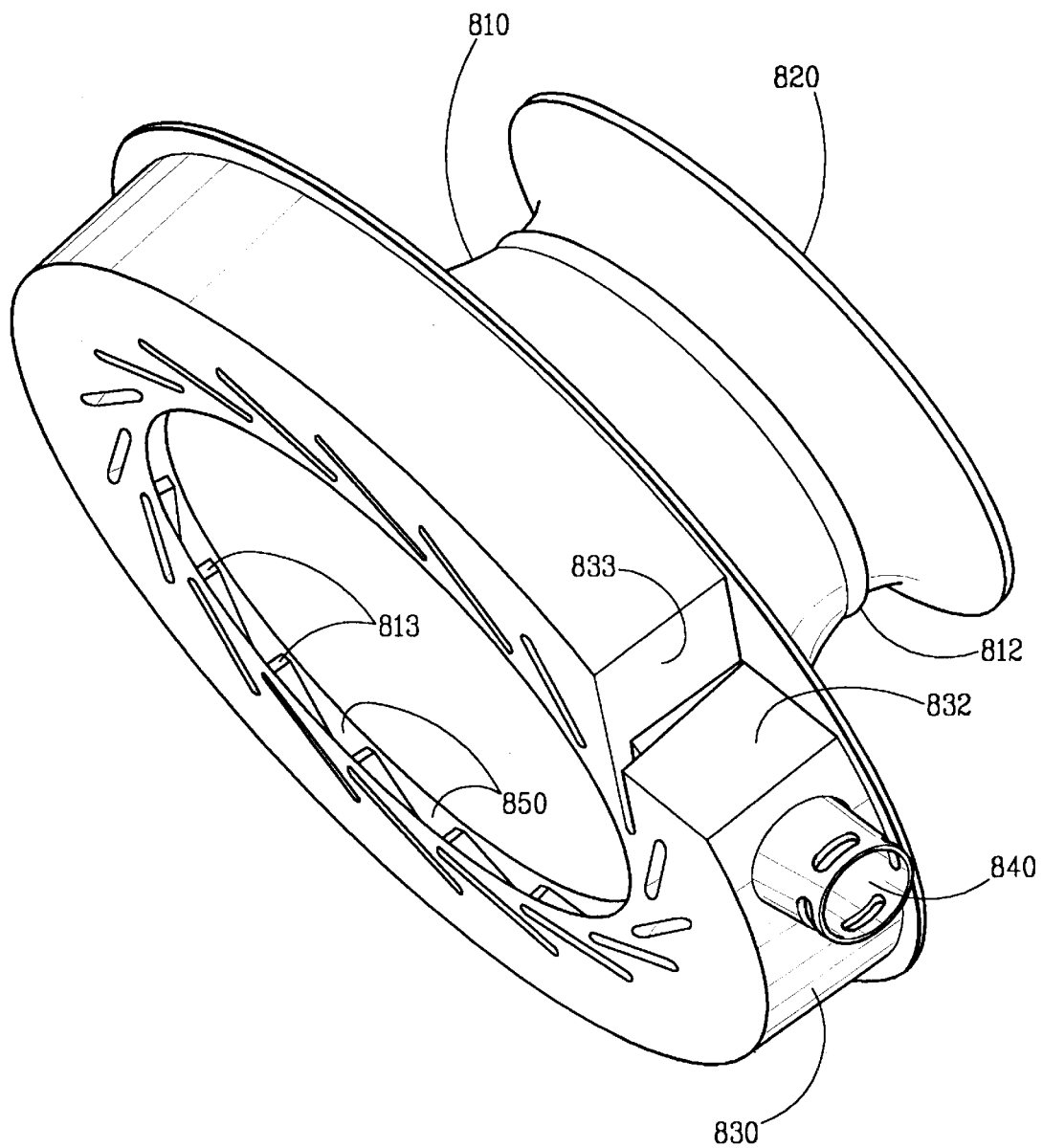
FIG. 8 is an isometric view of another embodiment of the invention.

FIG. 8 shows another embodiment of the present invention. The total height can be approximately 5 inches. The structure 810 has a circular cross section, varying from about 7 inches in diameter at the opening 820, to about 5 inches in diameter at the nozzle 812, back to about 7 inches in diameter at the end 813 near the work site. The debris removal openings 850 are immediately adjacent to the work site with vanes placed to give the fluid a clockwise rotation when viewed looking down at the work site. The collection plenum 830 is closed at one end. The removal openings 850 are graduated in size so that the cross sectional area increases by about 50% when progressing from the end of the collection plenum 832 nearest the vacuum connection 840 to the end 833 farthest from the vacuum connection 840. The removal openings 850 are sized so that the sum of their cross-sectional areas is approximately equal to the cross-sectional area of the vacuum connection 840. The removal openings 850 are shaped so that their minimum dimension is not less than half their maximum dimension. The vacuum connection 840 can have a cross sectional area of about 1 square inch, matching the total area of the removal openings. The system can remove debris such as smoke and small fat particles during laser burn debridement, using a flow rate of about 100 cubic feet per minute through the removal openings and to the vacuum connection. The structure can be formed by vacuum forming two plastic parts and then gluing them together.

The particular sizes and equipment discussed above are cited merely to illustrate particular embodiments of the invention. It is contemplated that the use of the invention may involve components having different sizes and characteristics as long as the principle, the removal of debris from the periphery of a work site, is followed. It is intended that the scope of the invention be defined by the claims appended hereto.

We claim:

1. An exhaust system for removing debris from a surface of a work site distinct from the exhaust system comprising:

a) a structure at least partially enclosing a work volume adjacent to the work site, wherein the structure comprises a bottom edge proximal to the work site and an upper portion above the work site;

b) supply means for introducing fluid into the structure; and c) removal means for removing debris and fluid from the structure at a fluid flow rate that is substantially uniform across the periphery of the work site surface in directions substantially parallel to the work site surface and substantially normal to the periphery of the work site surface.

2. The system of claim 1 wherein the removal means comprises:

a) a plurality of removal openings spaced about the structure periphery, and a collection plenum surrounding the removal openings;

b) means for establishing a lower pressure in the collection plenum than in the work volume; and c) means for removing debris from the collection plenum.

3. The system of claim 2 wherein the openings are circular.

4. The system of claim 2 wherein the means for removing debris from the collection plenum comprises a vacuum system, and wherein the collection plenum has a port opening adapted for connection to the vacuum system.

5. The system of claim 4 wherein the cross-sectional area of the port opening is substantially the same as the total of the cross-sectional areas of the removal openings.

6. The system of claim 4 wherein the collection plenum has first and second ends, and wherein the vacuum port is mounted at the first end, and wherein the second end is substantially closed to fluid flow.

7. The system of claim 6 wherein the removal openings are graduated in cross sectional area with the smallest near the first end, so that the fluid flow rate through the openings is substantially uniform.

8. A debris exhaust system to remove debris created at a work site region on a surface comprising:

a) a confinement structure laterally surround the work site region, the confinement structure having a bottom edge contacting the surface and an upper region above the work site region containing means for supplying fluid into the structure; and b) means for removing the fluid from the structure at a substantially uniform rate measured about the periphery of the work site and substantially normal to the periphery of the work site.

9. The debris exhaust system of claim 8, wherein the means for removing comprises a plurality of openings through the confinement structure disposed about the confinement structure adjacent said bottom edge, said openings being surrounded by a plenum located on the outside of the confinement structure with said plenum being connected to a vacuum system.

* * * * *